United States Patent Office 2,736,678
Patented Feb. 28, 1956

2,736,678

ADHESIVE SILICATE COMPOSITION AND METHOD OF USING THE SAME

Donald J. Olix, Fairport Harbor, Ohio, assignor to Diamond Alkali Company, Cleveland, Ohio, a corporation of Delaware No Drawing. Application May 13, 1953,
Serial No. 354,867

30 Claims. (Cl. 154—138)

This invention pertains to new compositions of matter comprising aqueous adhesive silicate glass. Silicate adhesives are well known as excellent materials for use in laminating cellulose-containing materials. The novel adhesive compositions of this invention are characterized by the presence of ingredients which give improved moisture resistance and which decrease the tendency of the silicate glass to adhere to heated metal surfaces. The invention relates also to methods of preparing cellulose-containing materials, such as corrugated paper box-board, as in laminating operations wherein the new compositions are utilized as the adhesive for bonding the laminates.

Difficulties in the manufacture of such corrugated paperboard arise when aqueous adhesive silicate glass comes into contact with the corrugating and pressure rolls, and the platens of the hot plate driers, forming thereon hard glass-like deposits which foul the rolls and thus necessitate interruption of production while the deposits are removed. Further, as the laminated structure passes between the pressure rollers and the platens of the hot-plate driers, some of the adhesive silicate glass exudes from the portions of the laminate nearest the edges thereof and is deposited upon the heated surface of the platens. After a relatively short period of time, these deposits of the exuded adhesive silicate material accumulate upon the surface of the platens and build up into ridges or mounds near the region of the edges of the moving laminated web and under the influence of the relatively intense heat of the platen surface are dehydrated to a hard, strongly adherent, solid silicate glass. These deposits are then in a position to effect the destruction of the edges of the moving laminated structure passing across the heated platen surface. Moreover, as the production of laminated webs of lesser and greater widths may be scheduled alternately during a given production period, the changeover from the lesser to the greater widths may leave deposits of the dehydrated silicate glass in a position to mar substantial areas longitudinally of the wider webs. When the accumulation of the deposits of dehydrated silicate glass are sufficient to cause the destruction of substantial areas of the wider laminated webs passing thereover, the whole operation must be interrupted and the heated platens cleaned before further production of such wider webs may be started. A major difficulty in the cleaning operation arises from the fact that the dehydrated silicate glass adheres quite strongly to the platens, requiring considerable time and hand labor to dislodge the deposits and refinish the surface.

The present invention is directed to a composition and method for decreasing the adhesion of an adhesive silicate glass composition to heated metal surfaces generally.

Another object of the invention is to provide a method and composition for preventing strong adhesion of aqueous adhesive silicate glasses commonly employed in the paper laminating industry to the heated metal surfaces of the platens used for forming laminates, the degree of adhesion being so low that any adhering adhesive is easily dislodged by a moving web of paperboard.

A further problem is sometimes encountered in using silicate adhesives in that under conditions of abnormally prolonged high humidity there is a tendency for the usually strong silicate adhesives to take up water and, when this occurs, its adhesive power is reduced somewhat. Therefore, in preparing silicate adhesives it is desirable to improve moisture resisting properties of adhesives, especially when they are employed in forming the bond in materials that are to be sent to regions normally highly humid.

It is, therefore, a further object of this invention to provide an aqueous adhesive silicate composition that is characterized not only by low adhesiveness to metal surfaces but which also has improved resistance to moisture.

These and other objects will occur to those skilled in the art from the description of the invention set forth below.

It is found that the addition of a suitable quantity of one or the other or a mixture of the starch acid esters described in U. S. Patent Number 2,613,206 and application Serial Number 77,296, filed February 18, 1949, now U. S. Patent 2,661,349, referred to therein, to the aqueous adhesive silicate, produces a composition which is greatly improved in respect to metal adhesion and moisture resistance. An exemplary compound may suitably be that manufactured by National Starch Products Co., known as Dry-Flo, which is a hydrophobic substituted succinic acid ester of starch having a pH of 6.5 to 7.0 and a gelatinization temperature of 70° C., and which is prepared in accordance with the teachings of the said application and patent. This material is insoluble in water and ordinary solvents and therefore some difficulty may be encountered in effecting its dispersal in the silicate glass; however, it is possible to bring about the admixture for the purposes of this invention by preparing an aqueous adhesive silicate glass solution containing 50% water by weight to which the ester is added with agitation and heating to about 40° C. A suitable mixture may be readily prepared in this manner and it may be used as a base from which other adhesive compositions can be prepared.

The production of the starch acid-ester or starch ester (the latter term being employed herein as synonymous with the former) of substituted dicarboxylic acids involves treatment of the starch with a substituted cyclic dicarboxylic acid anhydride of the following structural formula:

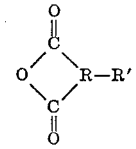

Substituted cyclic dicarboxylic acid anhydrides falling within this formula are the substituted succinic and glutaric acid anhydrides. In this formula, R represents a dimethylene or trimethylene radical and R' is the substituent hydrocarbon group. This substituent group R', which is a hydrophobic substituent, may be alkyl, alkenyl, aralkyl or aralkenyl. This substituent may contain from 1 to 18 carbon atoms. R' may be joined to the anhydride moiety R through a carbon-to-carbon bond (as in alkenyl succinic anhydride) or through two carbon-to-carbon bonds (as in the adduct of maleic anhydride with methyl pentadiene, or as in the cyclo-paraffinic cyclo-dicarboxylic acid anhydrides, such as, for example, cyclo-hexane 1,2-dicarboxylic acid anhydride), or may be linked through an ether or ester linkage (as, for example, in octyloxy succinic anhydride or in capryloxy succinic anhydride).

Regardless of the particular linkage between the substituent R' and the anhydride proper, all of the above-listed types fall within the class of substituted dicarboxylic acid anhydrides, such as succinic or glutaric. In place of the organic acid anhydrides mentioned above, one may also use the substituted dicarboxylic acid chlorides of those dicarboxylic acids which form cyclic anhydrides, such as, for example, alkenyl succinic acid chloride.

The starch may be of any type, including corn, potato, tapioca, sago, rice, wheat, waxy maize, sweet potato, or arrowroot. For purposes of the present invention, however, the starch should be ungelatinized—that is, in the form of its original discrete granules, and should remain in this form throughout the process.

The above-mentioned patents give various procedures for bringing about the reaction between starch and the substituted anhydride, to form the acid ester.

The examples hereinafter set forth illustrate the invention in both the use of substituted glutaric acids and substituted succinic acids, the use of the term "starch ester" being for convenience only. However, the term "starch ester" as used in the claims includes, in addition to these acids, other similar and equivalent acids which accomplish the purpose of this invention.

The proportion of starch ester which may suitably be combined in aqueous adhesive silicate glass solutions is not highly critical; compositions may contain from about 2% to about 25% of the ester based upon the weight of the mixture.

Usually, it is desirable to add a solid material so as to increase the covering power of the compositions. This may be any suitable finely divided siliceous material predominating preferably in aluminum silicates such as, for example, Barden clay, which, according to a publication of the producer of the material, is a kaolin clay characterized by small particles (80–85% less 2 microns) and high viscosity in 35% clay-water slip. (See Kaolin Clays and Their Industrial Uses, J. M. Huber Corporation, New York, New York, © 1949, pages 130–131). Further, the compositions include a quantity of water. As to the aqueous adhesive silicate glass solution, this is a material containing 35–45% solids and averaging on the weight basis 1 part of $Na_2O$ to between 2.5 and 4 parts of $SiO_2$, and suitably within the range of $1Na_2O$ to $3-3.5SiO_2$, preferably about $1Na_2O$ to 3.3 parts of $SiO_2$, and which may suitably contain a small amount of an anionic wetting agent, of which aromatic monosodium sulfonate derived from petroleum oil, alkyl aryl sulfonates, coconut oil sulfonates, and the like are examples, an exemplary quantity being about 1%. For convenience, the term "silicate" is employed in tables and claims hereinafter set forth to define this material as broadly described immediately above. For convenience, the term "silicate 33" is employed in examples and claims hereinafter to define an aqueous adhesive silicate glass having an $Na_2O:SiO_2$ ratio of 1:3.3 and an average solids content of 37.3%. The following table sets forth relative proportions of these ingredients in compositions falling within the scope of the invention:

TABLE I

| | Percent by weight |
|---|---|
| Silicate | 50–75 |
| Starch ester | 2–25 |
| Barden clay | 5–20 |
| Water | Balance to 100 parts |

Compositions within the scope of this table are easily released from the heated metal surfaces by light mechanical action, and are found to be self-releasing, i. e. they fall from the metal as they dry or if they adhere at all, are brushed off by moving paperboard, if they include a small quantity of a sugar, for example, Tanner's sugar, in quantity from about 0.5 to about 5%. Tanner's sugar, as is well-known in the art, is a dry, solid, unrefined corn sugar, the principal carbohydrate being glucose.

The following specific example describes a composition having very acceptable properties:

*Example I*

| | Percent by weight |
|---|---|
| Silicate 33 | 57.5 |
| Starch ester | 11.3 |
| Barden clay | 13.2 |
| Water | 18.0 |

The following example illustrates another preferred composition including a sugar:

*Example II*

| | Percent by weight |
|---|---|
| Silicate 33 | 72.3 |
| Starch ester | 10.0 |
| Barden clay | 7.0 |
| Tanner's sugar | 0.7 |
| Water | 10.0 |

The compositions of both Examples I and II show improved releasability and moisture resistance over unmodified silicate adhesives when tested under the same conditions.

Results very similar although still further improved but not necessarily preferred over those in Examples I and II, are obtained by the use of compositions having the following content:

*Example III*

| | Percent by weight |
|---|---|
| Silicate 33 | 51.5 |
| Starch ester | 9.8 |
| Barden clay | 17.9 |
| Ferric oxide | 5.3 |
| Water | 15.5 |

In this example a small quantity of ferric oxide is substituted for the sugar contained in the composition of Example II. However, where the paperboard or other material is to be reclaimed after use, this composition may not be usable as it will impart red color to the paper which is quite difficult to remove. The function of iron oxide in bringing about improvement is not clearly understood, and therefore no explanation for the phenomena is offered herein.

A still further additive has been found to produce excellent results when added to silicate adhesive compositions, but, again, its function in so doing is not known. This additive is a synthetic material, more particularly a condensation product composed of urea, sugar and formaldehyde. This substance may be more fully described and exemplified as a composite resinous product produced in the following manner:

One hundred and fifty grams of sucrose is dissolved in one hundred and twelve grams of 40% formalin. The solution is heated to the boiling point, and five grams of hexamethylenetetramine is added as a catalyst. Next, while the solution is still boiling, thirty-seven and one-half grams of urea are slowly added, heating being continued, with stirring until a clear solution is obtained. The solution is allowed to cool.

The following table is indicative of compositions including resinous materials which compositions have been found especially suitable for the purposes of this invention:

TABLE II

| | Percent by weight |
|---|---|
| Silicate | 50–75 |
| Starch ester | 2–25 |
| Sugar-urea-formaldehyde resin | 1–8 |
| Barden clay | 5–20 |
| Water | Balance to 100 parts |

A specific example of a composition falling within the scope of Table II is as follows:

*Example IV*

| | Percent by weight |
|---|---|
| Silicate 33 | 67.2 |
| Starch ester | 10.0 |
| Sugar-urea-formaldehyde resin | 5.8 |
| Barden clay | 7.0 |
| Water | 10.0 |

Preferred results in respect to improved moisture resistance and releasability from the heated metal surfaces are obtained when resinous material is combined with the ingredients of Example III in which ferric oxide is present. As indicative of such compositions the following table provides information as to varying relative percentage within the purview of the invention:

TABLE III

| | Percent by weight |
|---|---|
| Silicate | 50–75 |
| Starch ester | 2–25 |
| Sugar-urea-formaldehyde resin | 1–8 |
| Barden clay (kaolin-particles 80–85% less than 2 microns) | 5–20 |
| $Fe_2O_3$ | 0.5–10 |
| Water | Balance to 100 parts |

Specific examples of compositions falling within the scope of Table III are as follows:

*Example V*

| | Percent by weight |
|---|---|
| Silicate 33 | 65.2 |
| Starch ester | 10.0 |
| Sugar-urea-formaldehyde resin | 5.8 |
| Barden clay | 7.0 |
| Ferric oxide | 2.0 |
| Water | 10.0 |

*Example VI*

| | Percent by weight |
|---|---|
| Silicate 33 | 60.1 |
| Starch ester | 10.0 |
| Sugar-urea-formaldehyde resin | 5.9 |
| Barden clay | 7.0 |
| Ferric oxide | 7.0 |
| Water | 10.0 |

The method of this invention contemplates embodying the adhesive materials of the foregoing examples in processes of manufacturing where there is a problem of removing adhesive which has adhered to metal surfaces. More particularly, however, the invention contemplates employing the adhesive compositions as herein described and claimed in the typical paperboard laminating operations as described herein above.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A composition of matter comprising in major proportion aqueous adhesive silicate glass solution having a solids content of 35–45% and an $Na_2O:SiO_2$ ratio of 1:2.5–4, and in minor proportion, a starch ester of a hydrocarbon substituted dicarboxylic acid from the group consisting of glutaric and succinic acids.

2. A composition of matter as claimed in claim 1 which includes a small amount of an anionic wetting agent.

3. A composition of matter as claimed in claim 1 which includes a small quantity of a sugar.

4. A composition of matter as claimed in claim 1 which includes a small quantity of ferric oxide.

5. A composition of matter as claimed in claim 4 which includes a small quantity of sugar-urea-formaldehyde resin.

6. A composition of matter comprising 50–75% by weight of an aqueous, adhesive silicate glass solution having a solids content of 35–45% and an $Na_2O:SiO_2$ ratio of 1:2.5–4, 2–25% by weight of a starch ester of a hydrocarbon substituted dicarboxylic acid from the group consisting of glutaric and succinic acids, 5–20% by weight of a kaolin clay, 80–85% of the particles of which are less than 2 microns, and the balance of which, to make 100% by weight, is water.

7. A composition of matter comprising 57.5% by weight of an aqueous adhesive silicate glass solution having a solids content of about 37.3% and an $Na_2O:SiO_2$ ratio of about 1:3.3, 11.3% by weight of a starch ester of a hydrocarbon substituted dicarboxylic acid from the group consisting of glutaric and succinic acids, 13.2% by weight of a kaolin clay, 80–85% of the particles of which are less than 2 microns, and the balance of which, to make 100% by weight, is water.

8. A composition of matter comprising 72.3% by weight of an aqueous adhesive silicate glass solution having a solids content of about 37.3% and an $Na_2O:SiO_2$ ratio of about 1:3.3, 10.0% by weight of a starch ester of a hydrocarbon substituted dicarboxylic acid from the group consisting of glutaric and succinic acids, 7.0% by weight of a kaolin clay, 80–85% of the particles of which are less than 2 microns, 0.7% by weight of solid, dry, unrefined corn sugar, and the balance of which, to make 100% by weight, is water.

9. A composition of matter comprising 51.5% by weight of an aqueous adhesive silicate glass solution having a solids content of about 37.3% and an $Na_2O:SiO_2$ ratio of about 1:3.3, 9.8% by weight of a starch ester of a hydrocarbon substituted dicarboxylic acid from the group consisting of glutaric and succinic acids, 17.9% by weight of a kaolin clay, 80–85% of the particles of which are less than 2 microns, 5.3% by weight of ferric oxide, and the balance of which, to make 100% by weight, is water.

10. A composition of matter comprising 50–75% by weight of an aqueous adhesive silicate glass solution having a solids content of 35–45% and an $Na_2O:SiO_2$ ratio of 1:2.5–4, 2–25% by weight of a starch ester of a hydrocarbon substituted dicarboxylic acid from the group consisting of glutaric and succinic acids, 1–8% by weight of a sugar-urea-formaldehyde resin, 5–20% by weight of a kaolin clay, 80–85% of the particles of which are less than 2 microns, and the balance of which, to make 100% by weight, is water.

11. A composition of matter comprising 67.2% by weight of an aqueous adhesive silicate glass solution having a solids content of about 37.3% and an $Na_2O:SiO_2$ ratio of about 1:3.3, 10.0% by weight of a starch ester of a hydrocarbon substituted dicarboxylic acid from the group consisting of glutaric and succinic acids, 5.8% by weight of a sugar-urea-formaldehyde resin, 7.0% by weight of a kaolin clay, 80–85% of the particles of which are less than 2 microns, and the balance of which, to make 100% by weight, is water.

12. A composition of matter comprising 50–75% by weight of an aqueous adhesive silicate glass solution having a solids content of 35–45% and an $Na_2O:SiO_2$ ratio of 1:2.5–4, 2–25% by weight of a starch ester of a hydrocarbon substituted dicarboxylic acid from the group consisting of glutaric and succinic acids, 1.8% by weight of a sugar-urea-formaldehyde resin, 5–20% by weight of a kaolin clay, 80–85% of the particles of which are less than 2 microns, 0.5–10% by weight of $Fe_2O_3$, and the balance of which, to make 100% by weight, is water.

13. A composition of matter comprising 65.2% by weight of an aqueous adhesive silicate glass solution having a solids content of about 37.3% and an $Na_2O:SiO_2$ ratio of about 1:3.3, 10.0% by weight of a starch ester of a hydrocarbon substituted dicarboxylic acid from the group consisting of glutaric and succinic acids, 5.8% by weight of a sugar-urea-formaldehyde resin, 7.0% by weight of a kaolin clay, 80–85% of the particles of which are less than 2 microns, 2.0% by weight of a ferric oxide, and the balance of which, to make 100% by weight, is water.

14. A composition of matter comprising 60.1% by weight of an aqueous adhesive silicate glass solution having a solids content of about 37.3% and an $Na_2O:SiO_2$ ratio of about 1:3.3, 10.0% by weight of a starch ester of a hydrocarbon substituted dicarboxylic acid from the group consisting of glutaric and succinic acids, 5.9% by weight of a sugar-urea-formaldehyde resin, 7.0% by weight of a kaolin clay, 80–85% of the particles of which are less than 2 microns, 7.0% by weight of a ferric oxide, and the balance of which, to make 100% by weight, is water.

15. A composition of matter as claimed in claim 14 which includes a small quantity of an anionic wetting agent as a portion of the percent by weight of the said silicate.

16. The method of preparing paperboard, which includes applying to the sheets of paper to be laminated, as the adhesive therefor, a composition comprising in major proportion aqueous silicate glass solution having solids content of 35–45% and an $Na_2O:SiO_2$ ratio of 1:2.5–4, and in minor proportion, a starch ester, pressing the sheets of paper together to form the laminate, and heating the laminate to set said adhesive composition.

17. The method as claimed in claim 16 wherein the said composition comprises a small quantity of an anionic wetting agent.

18. The method as claimed in claim 16 wherein the said composition comprises a small quantity of a sugar.

19. The method as claimed in claim 16 wherein the said composition comprises a small quantity of ferric oxide.

20. The method as claimed in claim 19 wherein the said composition comprises a small quantity of a sugar-urea-formaldehyde resin.

21. The method of preparing paperboard which includes applying to the sheets of paper to be laminated as the adhesive therefor, a composition comprising 50–75% by weight of an aqueous silicate glass solution having a solids content of 35–45% and an $Na_2O:SiO_2$ ratio of 1:2.5–4, 2–25% by weight of a starch ester of a hydrocarbon substituted dicarboxylic acid from the group consisting of glutaric and succinic acids, 5–20% by weight of a kaolin clay having an average particle size such that 80–85% of the particles are less than 2 microns, and water to make 100% by weight, pressing the sheets of paper together to form the laminate, and heating the laminate to set said adhesive composition.

22. The method of claim 21 wherein said aqueous adhesive silicate glass solution has a solids content of about 37.3% and an $Na_2O:SiO_2$ ratio of 1:3.3, and constitutes about 57.5% by weight of said composition, said starch ester constitutes about 11.3% by weight of said composition, said kaolin clay constitutes about 13.2% by weight of said composition, and water constitutes about 18% by weight of said composition.

23. The method as claimed in claim 21 which includes a small quantity of an anionic wetting agent as a portion by weight of said silicate.

24. The method of claim 21 wherein said aqueous adhesive silicate glass solution has a solids content of about 37.3% and an $Na_2O:SiO_2$ ratio of 1:3.3, and constitutes about 72.3% by weight of said composition, said starch ester constitutes about 10.0% by weight of said composition, said kaolin clay constitutes about 7.0% by weight of said composition, said dry, solid, unrefined corn sugar constitutes about 0.7% by weight of said composition, and water constitutes about 10.0% by weight of said composition.

25. The method of claim 21 wherein said aqueous adhesive silicate glass solution has a solids content of about 37.3% and an $Na_2O:SiO_2$ ratio of 1:3.3, and constitutes about 51.5% by weight of said composition, said starch ester constitutes about 9.8% by weight of said composition, said kaolin clay constitutes about 17.9% by weight of said composition, ferric oxide constitutes about 5.3% by weight of said composition, and water constitutes about 15.5% by weight of said composition.

26. The method of preparing paperboard which includes applying to the sheets of paper to be laminated as the adhesive therefor, a composition comprising 50–75% by weight of an aqueous silicate glass solution having a solids content of 35–45% and an $Na_2O:SiO_2$ ratio of 1:2.5–4, 2–25% by weight of a starch ester of a hydrocarbon substituted dicarboxylic acid from the group consisting of glutaric and succinic acids, 1–8% by weight of a sugar-urea-formaldehyde resin, 5–20% by weight of a kaolin clay having an average particle size such that 80–85% of the particles are less than 2 microns, and water to make 100% by weight, pressing the sheets of paper together to form the laminate, and heating the laminate to set said adhesive composition.

27. The method of claim 26 wherein said adhesive silicate composition contains about 67.2% by weight of an aqueous adhesive silicate solution having about 37.3% solids, an $Na_2O:SiO_2$ ratio of 1:3.3, 10% by weight of a starch ester of a hydrocarbon substituted dicarboxylic acid from the group consisting of glutaric and succinic acids, 5.8% by weight of a sugar-urea-formaldehyde resin, 7.0% by weight of a kaolin clay having an average particle size such that 80–85% of the particles are less than 2 microns, and about 10% of water by weight to make 100%, pressing the sheets of paper together to form the laminate, and heating the laminate to set said adhesive composition.

28. The method of preparing paperboard which includes applying to the sheets of paper to be laminated as the adhesive therefor, a composition comprising 50–75% by weight of an aqueous silicate glass solution having a solids content of 35–45% and an $Na_2O:SiO_2$ ratio of 1:2.5–4, 2–25% by weight of a starch ester of a hydrocarbon substituted dicarboxylic acid from the group consisting of glutaric and succinic acids, 1.8% by weight of a sugar-urea-formaldehyde resin, 5–20% by weight of a kaolin clay having an average particle size such that 80–85% of the particles are less than 2 microns, 0.5–10% by weight of $Fe_2O_3$, and water to make 100% by weight, pressing the sheets of paper together to form the laminate, and heating the laminate to set said adhesive composition.

29. The method of claim 28 wherein said aqueous adhesive silicate glass solution has a solids content of about 37.3% and an $Na_2O:SiO_2$ ratio of 1:3.3, and constitutes about 65.2% by weight of said composition, said starch ester constitutes about 10.0% by weight of said composition, said sugar-urea-formaldehyde resin constitutes about 5.8% by weight of said composition, said kaolin clay constitutes about 7.0% by weight of said composition, said ferric oxide constitutes about 2.0% by weight of said composition, and water constitutes about 10.0% by weight of said composition.

30. The method of claim 28 wherein said aqueous adhesive silicate glass solution has a solids content of about 37.3% and an $Na_2O:SiO_2$ ratio of 1:3.3, and constitutes about 60.1% by weight of said composition, said starch ester constitutes about 10.0% by weight of said composition, said sugar-urea-formaldehyde resin constitutes about 5.9% by weight of said composition, said kaolin clay constitutes about 7.0% by weight of said composition, said ferric oxide constitutes about 7.0% by weight of said composition, and water constitutes about 10.0% by weight of said composition.

References Cited in the file of this patent

UNITED STATES PATENTS

| | | |
|---|---|---|
| 2,078,836 | Carter | Apr. 27, 1937 |
| 2,150,147 | Bowen | Mar. 14, 1939 |
| 2,239,478 | Amberson | Apr. 22, 1941 |
| 2,385,438 | Fowler | Sept. 25, 1945 |
| 2,613,206 | Caldwell | Oct. 7, 1952 |
| 2,661,349 | Caldwell | Dec. 1, 1953 |

FOREIGN PATENTS

| | | |
|---|---|---|
| 446,190 | Great Britain | Apr. 27, 1936 |
| 272,562 | Switzerland | Apr. 2, 1951 |